United States Patent [19]
Gabriel et al.

[11] Patent Number: 5,489,179
[45] Date of Patent: Feb. 6, 1996

[54] FASTENER AND BUILDING ASSEMBLY COMPRISING WORKPIECE, SUBSTRATE, AND FASTENER

[75] Inventors: William L. Gabriel, Barrington; Lawrence S. Shelton, Morton Grove; Henry A. Sygnator, Arlington Heights; Elizabeth J. Eckmann, Chicago, all of Ill.

[73] Assignee: Illinois Tool Works Inc., Glenview, Ill.

[21] Appl. No.: 293,003

[22] Filed: Aug. 19, 1994

[51] Int. Cl.$^6$ .............................. F16B 15/06; F16B 15/08
[52] U.S. Cl. ...................... 411/453; 411/456; 411/922; 52/582.1
[58] Field of Search .................................. 411/451, 452, 411/453, 454, 455, 456, 480, 922; 52/582.1, 787.1

[56] References Cited

U.S. PATENT DOCUMENTS

| | | |
|---|---|---|
| 276,541 | 4/1883 | Sloan . |
| 426,008 | 4/1890 | Groff . |
| 1,326,910 | 1/1920 | Butterfield . |
| 1,912,222 | 5/1933 | Rosenberg . |
| 2,075,411 | 3/1937 | Von Mertens . |
| 2,093,610 | 9/1937 | Kraemer . |
| 2,190,883 | 2/1940 | Pauze . |
| 2,269,708 | 1/1942 | Dickson . |
| 2,967,448 | 1/1961 | Hallock . |
| 3,010,353 | 11/1961 | Psaros . |
| 3,019,460 | 2/1962 | Corckran . |
| 3,088,361 | 5/1963 | Hallock . |
| 3,106,791 | 10/1963 | Ball ........................................ 411/480 X |
| 3,214,875 | 11/1965 | Slowinski et al. ................... 411/451 X |
| 3,233,498 | 2/1966 | Handja . |
| 3,850,073 | 11/1974 | Hayes . |
| 4,718,802 | 1/1988 | Rockenfeller et al. ................. 411/421 |
| 4,915,561 | 4/1990 | Buhri et al. ............................. 411/439 |
| 4,932,820 | 6/1990 | Schniedermeier ....................... 411/455 |
| 5,261,770 | 11/1993 | Hoepker ................................. 411/441 |

FOREIGN PATENT DOCUMENTS

| | | | |
|---|---|---|---|
| 1072609 | 6/1967 | United Kingdom ................... 411/451 |
| 9100364 | 8/1991 | WIPO . |

*Primary Examiner*—Neill R. Wilson
*Attorney, Agent, or Firm*—Dressler, Goldsmith, Shore & Milnamow, Ltd.

[57] ABSTRACT

A building assembly comprises a wooden board, a metal framing member, and a fastener having an elongate shank, an enlarged head, and a generally pointed end and fastening the board to the framing member. The shank has a ringed portion with annular grooves defining annular rings having a uniform, outer diameter, helical grooves intersecting the annular grooves, a cylindrical land having a smaller diameter and dividing the ringed portion into an axially longer subportion nearer to the tip and an axially shorter subportion nearer the head, a cylindrical land between the tip and the ringed portion, and a cylindrical land between the head and the ringed portion. The fastener is driven through the board and through the framing member wall so that the head bears against the board, so that the tip and the shank form, from the wall of the framing member, a generally annular lip projecting toward the tip and so that the lip is disposed around the cylindrical land dividing the ringed portion. The wall of the framing member has sufficient resiliency for the lip when disposed around the cylindrical land to have an inner diameter smaller than the outer diameter of the annular ring nearest to the cylindrical land among the annular rings of the subportion nearer to the tip. Each helical groove taken in cross-section is either symmetrical or asymmetrical with respect to a plane comprising the axis defined by the shank and intersecting said helical groove where such helical groove is deepest.

23 Claims, 1 Drawing Sheet

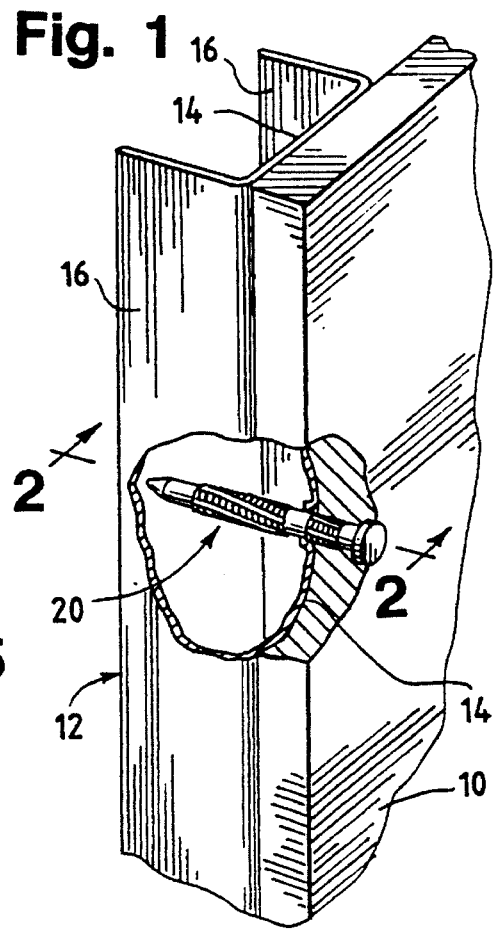
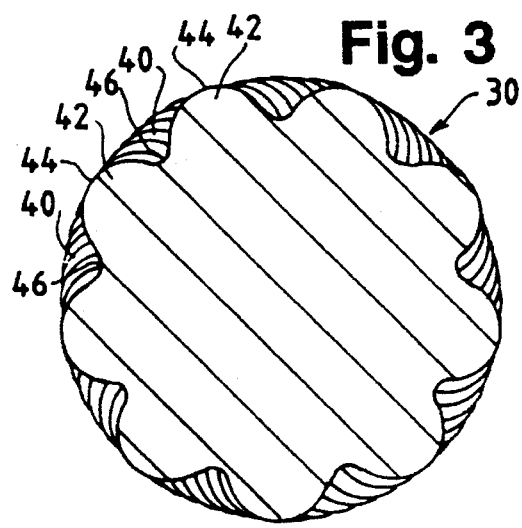
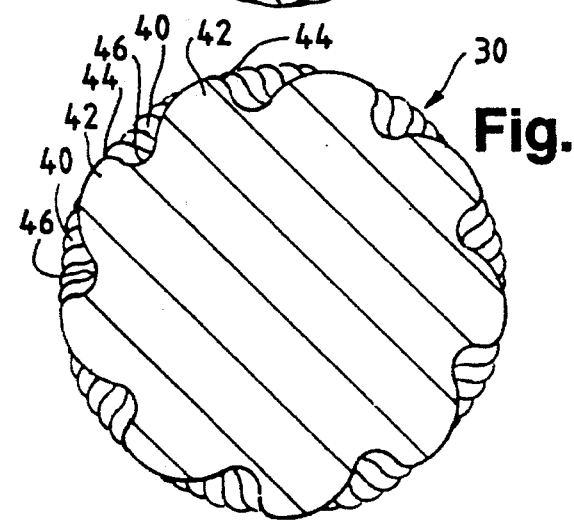
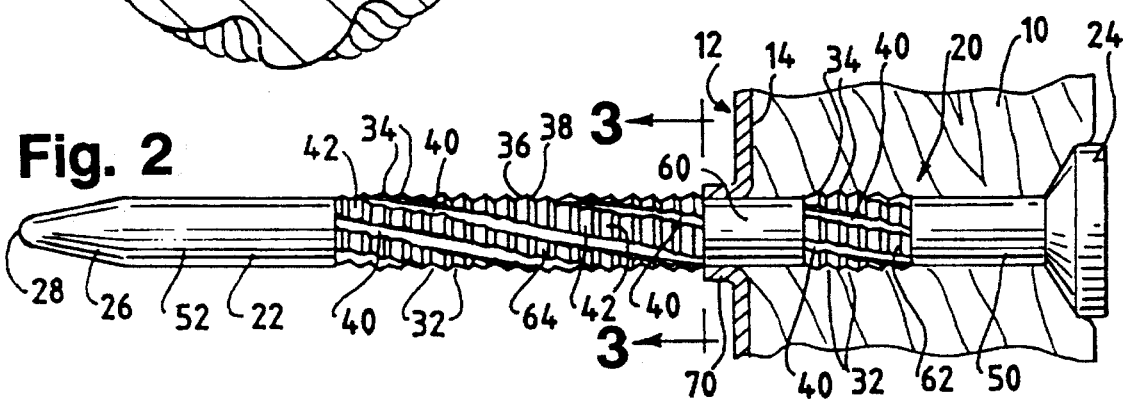
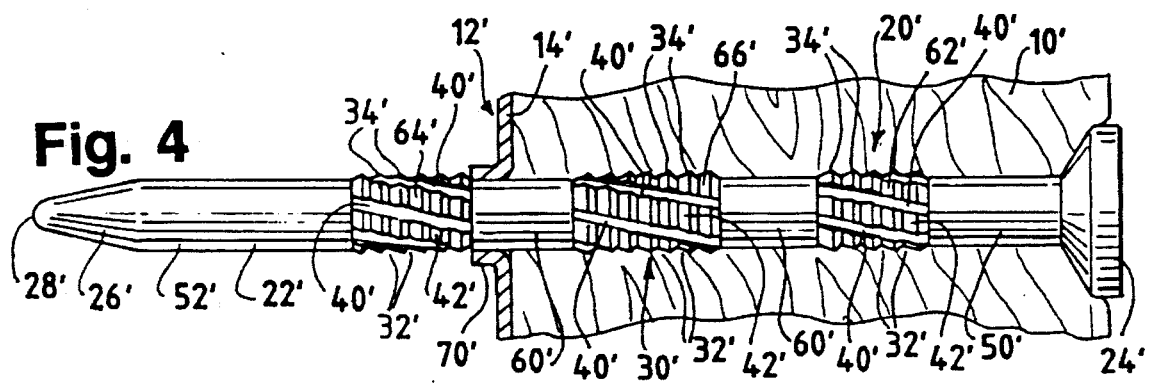

FASTENER AND BUILDING ASSEMBLY COMPRISING WORKPIECE, SUBSTRATE, AND FASTENER

TECHNICAL FIELD OF THE INVENTION

This invention pertains to a fastener, which has a unique configuration along its shank, and which is useful primarily for fastening a workpiece having a given thickness to a metal substrate having a thinner wall and secondarily for fastening such a workpiece to a wooden substrate. This invention also pertains to a building assembly comprising such a workpiece, such a metal substrate, and such a fastener.

BACKGROUND OF THE INVENTION

Fasteners of various configurations are known for fastening relatively thick workpieces, such as boards made of plywood or plasterboard, to various substrates, such as metal framing members, wooden framing members, and wooden underlayments. Commonly, such fasteners have elongate shanks defining axes and are designed to be axially driven by powered tools, such as pneumatically powered tools or combustion-powered tools.

Generally, heretofore, it has been necessary to use fasteners of different configurations for fastening such relatively thick workpieces to relatively thick, wooden substrates, such as wooden framing members and wooden underlayments, and for fastening such relatively thick workpieces to relatively thin, metal substrates, such as metal framing members.

A fastener having a tapered shank, a series of rings or ridges along the tapered shank, and helical grooves along the series of rings or ridges and appearing to be particularly useful for fastening a wooden board to a wooden underlayment is disclosed in Rockenfeller et al. U.S. Pat. No. 4,718,802. The fastener disclosed therein does not appear to be alternatively useful for fastening a relatively thick workpiece, such as a wooden board, to a relatively thin, metal substrate, such as a metal framing member.

Fasteners of various configurations for fastening relatively thick workpieces to metal substrates having relatively thin walls are exemplified in Rosenberg U.S. Pat. No. 1,912,222, von Mertens U.S. Pat. No. 2,075,411, and Hayes U.S. Pat. No. 3,850,073.

SUMMARY OF THE INVENTION

This invention provides an improved fastener, which is useful primarily for fastening a workpiece having a given thickness, such as a wooden board, to a metal substrate having a thinner wall, such as a metal framing member, and secondarily for fastening such a workpiece to a wooden substrate, such as a wooden framing member or a wooden underlayment. The improved fastener may be readily adapted to be axially driven by a powered tool, such as a pneumatically powered tool or a combustion-powered tool.

The improved fastener has an elongate shank defining an axis, an enlarged head formed at one end of the shank, and a generally tapered section forming a tip at the other end of the shank. The shank has a ringed portion formed with annular grooves defining annular rings.

In a preferred embodiment, the improved fastener differs from prior fasteners in that the ringed portion of the shank is divided by a cylindrical land into a subportion nearer the head and a subportion nearer the tip. Moreover, the cylindrical land dividing the ringed portion has a diameter smaller than the outer diameter of the annular ring nearest to the cylindrical land in an axial direction toward the tip.

Preferably, the annular rings of the ringed portion define an imaginary cylinder and have a uniform, outer diameter, and the subportion nearer to the tip has an axial length greater than the axial length of the subportion nearer to the head. Preferably, moreover, the shank has a cylindrical land between the head and the subportion nearer to the head and a cylindrical land between the tip and the subportion nearer to the tip. These lands also have a diameter less than the imaginary outer diameter of the annular ring nearest the ends of the land.

Optimally, the ringed portion of the shank has helical grooves intersecting the annular grooves and defining helical ribs. Each helical groove and the respective helical rib taken in cross-section may be symmetrical or asymmetrical with respect to a helical plane comprising the axis defined by the shank and intersecting such helical groove or rib where such helical groove is deepest or rib is highest.

Optimally, the fastener is made from carbon steel wire and is heat-treated and either mechanically or electrolytically zinc-plated. In one embodiment, the fastener may also be chromate-coated.

In an alternative embodiment, the fastener is similar except that the ringed subportion is divided by two cylindrical lands having similar diameters smaller than the outer diameters of the annular rings nearest to the respective lands in the axial direction of the tip into three subportions, namely a subportion nearer to the head, an intermediate subportion, and a subportion nearer to the tip, each subportion having a series of said rings spaced axially from one another.

This invention also provides an improved building assembly comprising a workpiece having a given thickness, such as a wooden board, a metal substrate having a thinner wall, such as a metal framing member, and the improved fastener.

If the fastener conforms to the preferred embodiment, the fastener is driven through the workpiece and through the wall of the substrate so that the head bears against the workpiece, so that the tip and the shank form, from the wall of the substrate, a generally annular lip projecting toward the tip and so that the lip is disposed around one of the cylindrical lands, between the annular rings nearest to the cylindrical land in both axial directions.

If the fastener conforms to the alternative embodiment, the fastener is driven through the workpiece and through the wall of the substrate so that the head bears against the workpiece, so that the tip and the shank form, from the wall of the substrate, a generally annular lip projecting toward the tip and so that the lip is disposed around one of the cylindrical lands, between the annular rings nearest to the same one of the cylindrical lands in both axial directions.

In either instance, the wall of the substrate has sufficient resiliency for the lip when disposed around the cylindrical land to have an inner diameter smaller than the outer diameter of the annular ring nearest to the lip so that the annular ring nearest to the lip can engage the lip so as to resist withdrawal of the fastener.

These and other objects, features, and advantages of this invention are evident from the following description of at least two embodiments of this invention with reference to the accompanying drawings.

BRIEF DESCRIPTION OF THE DRAWINGS

FIG. 1 is a fragmentary, perspective, partly cutaway view of a building assembly comprising a workpiece having a given thickness, namely a wooden board, a metal substrate having a thinner wall, namely a metal framing member, and a fastener constituting a preferred embodiment of this invention. As shown in FIG. 1, the fastener has an elongate shank having a ringed portion, which has helical grooves defining helical ribs and which is divided by a cylindrical land into two subportions.

FIG. 2, on an enlarged scale, is a sectional view taken along line 2—2 of FIG. 1, in a direction indicated by arrows.

FIG. 3, on a further enlarged scale, is a sectional view taken along line 3—3 of FIG. 2, in a direction indicated by arrows. FIG. 3 shows a preferred configuration of the helical grooves of the ringed portion of the fastener.

FIG. 4 is a sectional view similar to FIG. 2 but showing a building assembly comprising a similar workpiece, a similar substrate, and a fastener constituting an alternative embodiment of this invention. As shown in FIG. 4, the fastener has an elongate shank having a ringed portion, which has helical grooves and which is divided by two cylindrical lands into three subportions.

FIG. 5 is a sectional view similar to FIG. 3 but showing an alternative configuration of the helical grooves of the ringed portion of the fastener.

DETAILED DESCRIPTION OF THE ILLUSTRATED EMBODIMENTS

As shown in FIGS. 1, 2, and 3, a building assembly comprises a relatively thick, wooden board 10, a metal framing member 12 having a relatively thin wall 14 and two relatively thin flanges 16 extending normally from the relatively thin wall 14, and a fastener 20 constituting a preferred embodiment of this invention.

The board 10 may be made from plywood. The framing member, or steel stud, 12 may be made from relatively mild galvanized steel. In one preferred embodiment, the fastener 20 may be made from 1030 carbon steel wire, heat-treated to a core hardness of 40 to 45 Rockwell C and to a surface hardness of 42 to 50 Rockwell C, and mechanically or electrolytically zinc-plated. In another embodiment it may also be chromate-coated.

The fastener 20 has an elongate shank 22 defining an axis, an enlarged head 24 formed at one end of the shank 22 and chamfered where the head faces the shank 22, and a tapered section ending in a tip 26 formed at the other end of the shank 22. Preferably, as shown, the tip 26 is frusto-conical except for a rounded end 28. The tip section could also be of an ogive shape. It is preferable that the end 28 of the tip 26 not be too sharp or it may bend over in the heat treating operation or upon penetration of the steel stud 12 causing the hole formed therein not to be uniform. Moreover, it is preferable that the tip 26 not be diamond shaped as that may cause the edges of the resulting hole in the steel stud to peal back similar to a banana peal. Preferably the ballistic point of the tip 26 has a 25 degree angle.

The shank 22 has a ringed portion 30 formed with a series of annular grooves 32 and a series of annular rings 34. Where the annular grooves are deepest, the annular grooves 32 define an imaginary cylinder having a groove inner diameter. The annular rings 34 are spaced axially from one another by the annular grooves 32. Where the annular rings 34 are largest, the annular rings 34 define an imaginary cylinder having a ring outer diameter. In a preferred embodiment the ring outer diameter is about 0.016 inches larger than the groove inner diameter making the rings approximately 0.008 inches tall. Thus, the annular rings 34 have a uniform, outer diameter along the axial length of each subportion.

Each annular ring 34 has a frusto-conical, leading surface 36 facing toward the tip 26 and defining a comparatively small, acute angle relative to the axis and a frusto-conical, trailing surface 38 facing toward the head 24 and defining a comparatively large, acute angle relative to the axis. Each annular groove 32 may be rounded at a small radius where the frusto-conical surfaces bounding such groove 32, namely the leading surface 36 of one such ring 34 and the trailing surface 38 of the next ring 34 in the axial direction of the tip 26, would intersect if such annular groove 32 were not rounded. This provides for less of a stress riser along the shank in this area providing for greater strength. Each annular ring 34 may be rounded at a small radius where the leading surface 36 of such ring 34 and the trailing surface 38 of such ring 34 would intersect if such annular ring 34 were not rounded.

The ringed portion 30 has a circumferential array of helical grooves 40 intersecting the annular grooves 32 and defining a circumferential array of helical ribs 42 intersecting the annular rings 34. In preferred embodiments, there are between seven and eleven helical grooves and ribs. Each helical rib 42 has a rounded crest 44, which is tangent with the imaginary cylinder defined by the annular rings 34, where such helical rib 42 is largest. Each helical groove 40 has a rounded valley 46, which has an inner diameter that is less than the imaginary cylinder defined by the annular grooves 32, where such helical groove 40 is deepest, since the helical grooves are cut much deeper into the shank than the annular grooves. Moreover, the helical grooves must be at a shallow enough angle that the fastener can rotate about its longitudinal axis and along the axis of the grooves as the fastener is being driven into the wood and steel. A preferable angle has been found to be 11 degrees when used with seven grooves. The helical grooves actually cause each annular rib to be a set of seven circumferentially spaced points in this embodiment.

Preferably, as shown in FIG. 3, each helical groove 40 taken in cross-section is symmetrical with respect to a plane comprising the axis defined by the shank 22 and intersecting such helical groove 40 where such helical groove 40 is deepest. Alternatively, as shown in FIG. 5, each helical groove 40 taken in cross-section is asymmetrical with respect to a plane comprising the axis defined by the shank 22 and intersecting such helical groove 40 where such helical groove 40 is deepest.

The shank 22 has three cylindrical lands, namely a cylindrical land 50 between the ringed portion 30 and the head 24, a cylindrical land 52 between the ringed portion 30 and the tip 26, and a circumferential land 60 dividing the ringed portion 30 into a subportion 62 nearer to the head 24 and a subportion 64 nearer to the tip 26.

The cylindrical lands 50, 52, 60, have a uniform, outer diameter, which is smaller than the uniform, outer diameter of the annular rings 32. Each of the subportions 62, 64, has a series of the annular grooves 32 and a series of the annular rings 34. The subportion 64 nearer to the tip 26 has an axial length greater than the axial length of the subportion 62 nearer to the head 24. In a preferred embodiment, at least two of the lands 52 and 60 are also used as a base for the welding of a wire connector of one fastener to another to collate the fasteners for rapid registration and firing from a driving tool.

As shown in FIG. 2, the fastener 20 is driven through the relatively thick board 10 and through the relatively thin wall 14 so that the head 24 bears against and is countersunk partially into the board 10 and so that the tip 26 and the shank 22 form, from the wall 14, a generally annular lip 70 projecting toward the tip 26 and so that the lip 70 is disposed around the cylindrical land 60, between the nearest ring 34 of the subportion 62 and the nearest ring 34 of the subportion 64.

Being made from galvanized steel or other suitable metal, the wall 14 has sufficient resiliency and memory for the lip 70 when disposed around the cylindrical land 60 to have an inner diameter smaller than the outer diameter of the annular ring 34 nearest to the lip 70 in the axial direction of the tip 26 so that the annular ring 34 nearest thereto can engage the lip 70 so as to resist withdrawal of the fastener 20. The wall's resiliency and memory is small. Accordingly, to be effective, the fastener must make a small, uniform hole therein. The shape of the tip section 26 and the land 52 adjacent the tip 26 cause the steel stud 12 to believe the fastener to have as small a diameter as possible, thus enhancing the holding power of the fastener.

As shown in FIG. 4, a building assembly comprises a wooden board 10', which is thicker than the board 10, a metal framing member 12', which is similar to the metal framing member 12 and which has a relatively thin wall 14' similar to the wall 14, and a fastener 20' constituting an alternative embodiment of this invention.

The fastener 20' is similar to the fastener 20 in that the fastener 20' has an elongate shank 22' defining an axis, an enlarged head 24' formed at one end of the shank 22' and chamfered where the head 24' faces the shank 22', and a generally pointed tip 26' formed at the other end of the shank 22'.

The shank 22' of the fastener 20' has a ringed portion 30' formed with a series of annular grooves 32' and a series of annular rings 34'. The annular grooves 32' are similar to the annular grooves 32. The annular rings 34' are similar to the annular rings 34. The ringed portion 30' has a circumferential array of helical grooves 40' intersecting the annular grooves 32' and defining a circumferential array of helical ribs 42'. The helical grooves 40' are similar to the helical grooves 40. The helical ribs 42' are similar to the helical ribs 42'.

The shank 22' has four cylindrical lands, namely a cylindrical land 50' between the ringed portion 30' and the head 24', a cylindrical land 52' between the ringed portion 30' and the tip 26', and two circumferential lands 60' dividing the ringed portion 30' into a subportion 62' nearer to the head 24', a subportion 64' nearer to the tip 26', and an intermediate subportion 66' between the subportion 62' and the subportion 64'.

The cylindrical lands 50', 52', 60', have a uniform diameter, which is smaller than the uniform, outer diameter of the annular rings 32'. Each of the subportions 62', 64', 66', has a series of the annular grooves 32' and a series of the annular rings 34'. The subportion 66' has an axial length greater than the axial lengths of the subportion 62' nearer to the head 24' and greater than the axial length of the subportion 64' nearer to the tip 26'.

As shown in FIG. 4, the fastener 20' is driven through the relatively thick board 10' and through the relatively thin wall 14' so that the head 24' bears against and is countersunk partially into the board 10' and so that the tip 26' and the shank 22' form, from the wall 14', a generally annular lip 70' projecting toward the tip 26' and so that the lip 70' is disposed around the cylindrical land 60 nearer to the tip 26', between the nearest ring 34' of the subportion 66' and the nearest ring 34' of the subportion 64'.

Alternatively, if the building assembly shown in FIG. 4 were to comprise a board (not shown) having a thickness similar to the thickness of the board 10, the fastener 20' would be then driven so that the lip 70' would be then disposed around the cylindrical land 60 nearer to the head 24', between the nearest ring 34' of the subportion 66' and the nearest ring 34' of the subportion 62'.

Being made from galvanized steel or other suitable metal, the wall 14' has sufficient resiliency and memory for the lip 70' when disposed around either of the cylindrical lands 60' to have an inner diameter smaller than the outer diameter of the annular ring 34' nearest to the lip 70' in the axial direction of the tip 26' so that the annular ring 34' nearest thereto can engage the lip 70' so as to resist withdrawal of the fastener 20'.

Either of the fasteners 20, 20', may be alternatively used to fasten a board, such as the board 10 or the board 10', to a wooden substrate (not shown) that may be as thick as or thicker than the board being fastened to the wooden substrate. Moreover, either of the fasteners may also be used to hold wood or plywood of a thickness different than that shown to wood. Obviously, the steel stud 12 might not rest against the annular ring adjacent the land in such an instance. However, the fasteners have good holding power in any event because the steel stud will rest against some annular ring along the subportion.

High speed videos of a preferred embodiment show that the fastener rotates while being driven into the wood and steel along the axis created by the helical grooves. This, coupled with the lands, causes the outer points of the annular rings not to register with grooves cut into the wall of the hole of the steel stud, allowing for increased holding power. Moreover, the videos have shown the phenomenon of the steel stud 12 moving with the fastener as it is being driven and then bouncing back into place after the fastener's forward progress has been halted by the head 24 being seated into the plywood 10. It is theorized that this bouncing back coupled with the radial resiliency and memory of the steel stud adjacent the hole causes the annular rings to be effective in holding the wood to the steel.

Various modifications may be made in the preferred and alternative embodiments described above without departing from the scope and spirit of this invention.

We claim:

1. A fastener having an elongate shank defining an axis, the fastener having an enlarged head formed at one end of the shank and a generally pointed tip formed at the other end of the shank, the shank having a ringed portion formed with annular grooves defining annular rings, each ring having an outer diameter, the ringed portion being divided by a cylindrical land into a subportion nearer to the head and a subportion nearer to the tip, each subportion having a series of said rings spaced axially from one another, wherein the cylindrical land dividing the ringed portion has a diameter smaller than the outer diameter of the annular ring nearest to the cylindrical land in an axial direction toward the tip, wherein the annular rings of the ringed portion define an imaginary cylinder and have a uniform, outer diameter, and wherein the subportion nearer to the tip has an axial length greater than the axial length of the subportion nearer to the head.

2. The fastener of claim 1 wherein the shank has a cylindrical land between the head and the subportion nearer to the head and a cylindrical land between the tip and the subportion nearer to the tip.

3. The fastener of claim 2 wherein the ringed portion of the shank is formed with helical grooves intersecting the annular grooves and defining helical ribs.

4. The fastener of claim 3 wherein each helical groove taken in cross-section is symmetrical with respect to a plane comprising the axis defined by the shank and intersecting said helical groove where said helical groove is deepest.

5. The fastener of claim 3 wherein each helical groove taken in cross-section is asymmetrical with respect to a plane comprising the axis defined by the shank and intersecting said helical groove where said helical groove is deepest.

6. A fastener having an elongate shank defining an axis, the fastener having an enlarged head formed at one end of the shank and a generally pointed tip formed at the other end of the shank, the shank having a ringed portion formed with annular grooves defining annular rings and with helical grooves intersecting the annular grooves and defining helical ribs, each helical groove being asymmetrical with respect to a plane comprising the axis defined by the shank and intersecting said helical groove where said helical groove is deepest.

7. The fastener of claim 6 wherein the helical grooves are similar to one another.

8. The fastener of claim 7 wherein the helical ribs have rounded crests.

9. The fastener of claim 8 wherein the helical grooves are rounded where deepest.

10. A building assembly comprising a workpiece having a given thickness, a metal substrate having a thinner wall, and a fastener fastening the workpiece to the substrate, the fastener having an elongate shank, an enlarged head formed at one end of the shank, and a generally pointed tip formed at the other end of the shank, the shank having a ringed portion formed with annular grooves defining annular rings, each ring having an outer diameter, the ringed portion being divided by a cylindrical land into a subportion nearer to the head and a subportion nearer to the tip, each subportion having a series of said rings spaced axially from one another, wherein the cylindrical land dividing the ringed portion has a diameter smaller than the outer diameter of the annular ring nearest to the cylindrical land dividing the ringed portion in an axial direction toward the tip, wherein the fastener is driven through the workpiece and through the substrate so that the head bears against the workpiece, so that the tip and the shank form, from the wall of the substrate, a generally annular lip projecting toward the tip and so that the lip is disposed around the cylindrical land, between the annular rings nearest to the cylindrical land in both axial directions, and wherein the wall of the substrate has sufficient resiliency for the lip when disposed there around to have an inner diameter smaller than the diameter of the annular ring nearest to the lip so that the annular ring nearest to the lip can engage the lip so as to resist withdrawal of the fastener.

11. The building assembly of claim 10 wherein the annular rings of the ringed portion define an imaginary cylinder and have a uniform, outer diameter, and wherein the subportion nearer to the tip has an axial length greater than the axial length of the subportion nearer to the head.

12. The building assembly of claim 11 wherein the shank has a cylindrical land between the head and the subportion nearer to the head.

13. The building assembly of claim 11 wherein the shank has a cylindrical land between the tip and the subportion nearer to the tip.

14. The building assembly of claim 13 wherein the shank has a cylindrical land between the head and the subportion nearer to the head and a cylindrical land between the tip and the subportion nearer to the tip.

15. The building assembly of claim 14 wherein the helical portion of the shank is formed with helical grooves intersecting the annular grooves.

16. The building assembly of claim 15 wherein each helical groove taken in cross-section is symmetrical with respect to a plane comprising the axis defined by the shank and intersecting said helical groove where said helical groove is deepest.

17. The building assembly of claim 15 wherein each helical groove taken in cross-section is asymmetrical with respect to a plane comprising the axis defined by the shank and intersecting said helical groove where said helical groove is deepest.

18. The building assembly of claim 10 wherein the workpiece is wooden and wherein the fastener is made from carbon steel wire, heat-treated, and zinc-plated.

19. The building assembly of claim 18 wherein the workpiece is wooden and wherein the fastener is chromate-coated.

20. A building assembly comprising a workpiece having a given thickness, a metal substrate having a thinner wall, and a fastener fastening the workpiece to the substrate, the fastener having an elongate shank, enlarged head formed at one end of the shank, and a generally pointed tip formed at the other end of the shank, the shank having a ringed portion formed with annular grooves defining annular rings, each ring having an outer diameter, the ringed portion being divided by cylindrical lands into a subportion nearer to the head, at least one intermediate subportion, and a subportion nearer to the tip, each subportion having a series of said rings spaced axially from one another, wherein each cylindrical land dividing the ringed portion has a diameter smaller than the outer diameter of the annular ring nearest to said cylindrical land in an axial direction toward the tip, wherein the fastener is driven through the workpiece and through the wall of the substrate so that the head bears against the workpiece, so that the tip and the shank form, from the wall of the substrate, a generally annular lip projecting toward the tip and so that the lip is disposed around one of the cylindrical lands, between the annular rings nearest to the same one of the cylindrical lands in both axial directions, and wherein the wall of the substrate has sufficient resiliency for the lip when disposed there around to have an inner diameter smaller than the diameter of the annular ring nearest to the lip so that the annular ring nearest to the lip can engage the lip so as to resist withdrawal of the fastener.

21. The building assembly of claim 20 wherein the ringed subportion is divided by two cylindrical lands having similar diameters smaller than the diameters of the annular rings nearest to the respective lands into three subportions, namely a subportion nearer to the head, an intermediate subportion, and a subportion nearer to the tip, each subportion having a series of said rings spaced axially from one another.

22. A fastener having an elongate shank defining an axis, the fastener having an enlarged head formed at one end of the shank and a generally pointed tip at the other end of the shank, the tip being frusto-conical and having a rounded end, the shank having a ringed portion formed with annular grooves defining annular rings and with helical grooves intersecting the annular grooves and defining helical ribs, the helical grooves being deeper than the annular grooves, the shank having a constant diameter along the ringed portion except for the annular and helical grooves, the shank having a cylindrical land between the ringed portion and the tip and a cylindrical land between between the ringed portion and the head.

23. The fastener of claim 22 wherein the shank has a cylindrical land dividing the ringed portion into a subportion nearer to the head and a subportion nearer to the tip.

* * * * *

UNITED STATES PATENT AND TRADEMARK OFFICE
CERTIFICATE OF CORRECTION

PATENT NO. : 5,489,179

DATED : February 6, 1996

INVENTOR(S) : Gabriel et al.

It is certified that error appears in the above-indentified patent and that said Letters Patent is hereby corrected as shown below:

Column 4, line 56, "annular rings 32" should be --annular rings 34--.

Column 5, line 53, "annular rings 32'" should be --annular rings 34'--.

Column 10, line 1, one occurrence of "between" should be deleted.

Signed and Sealed this

Twenty-first Day of May, 1996

BRUCE LEHMAN

*Attest:*

*Attesting Officer*    *Commissioner of Patents and Trademarks*